United States Patent [19]

Brown et al.

[11] 4,318,275

[45] Mar. 9, 1982

[54] ATMOSPHERIC THERMAL ENERGY CONVERSION SYSTEM

[75] Inventors: Melvin H. Brown, Freeport; William H. Tingle, Lower Burrell, both of Pa.

[73] Assignee: Aluminum Company of America, Pittsburgh, Pa.

[21] Appl. No.: 155,464

[22] Filed: Jun. 2, 1980

[51] Int. Cl.³ ............................................. F03G 7/04
[52] U.S. Cl. .................................. 60/675; 60/641.6; 60/649
[58] Field of Search ...................... 60/675, 641.6, 660, 60/649

[56] References Cited

U.S. PATENT DOCUMENTS

| | | |
|---|---|---|
| 2,083,611 | 6/1937 | Marshall . |
| 2,462,557 | 2/1949 | Santee . |
| 2,559,870 | 7/1951 | Gay . |
| 2,575,478 | 11/1951 | Wilson . |
| 2,693,939 | 11/1954 | Marchant et al. . |
| 2,841,965 | 7/1958 | Etherington . |
| 2,867,094 | 1/1959 | Herrick . |
| 2,951,350 | 9/1960 | Etherington et al. . |
| 3,019,614 | 2/1962 | Schubert . |
| 3,953,971 | 5/1976 | Parker .......................... 60/675 |
| 4,242,870 | 1/1981 | Searingen et al. ............ 60/651 |

*Primary Examiner*—Allen M. Ostrager
*Attorney, Agent, or Firm*—Elroy Strickland

[57] ABSTRACT

A method of providing useful work utilizing the difference between higher and lower elevations and an attendant difference in temperature. The method includes the step of providing a working medium comprised of more than one component, the components having different temperature values at which they vaporize and condense. Vapors of the working medium are condensed at the location of the higher elevation, and are directed under the force of gravity to means at a lower elevation capable of utilizing the medium in liquid form to produce useful work. The working medium in liquid form absorbs heat at the lower elevation and produces the vapors for the condensation step, the vapors being directed from the lower elevation to the higher elevation for condensing. The composition of the working medium is adjusted to response to changes in ambient temperature to provide a system having maximum efficiency in extracting work from the working medium.

5 Claims, 3 Drawing Figures

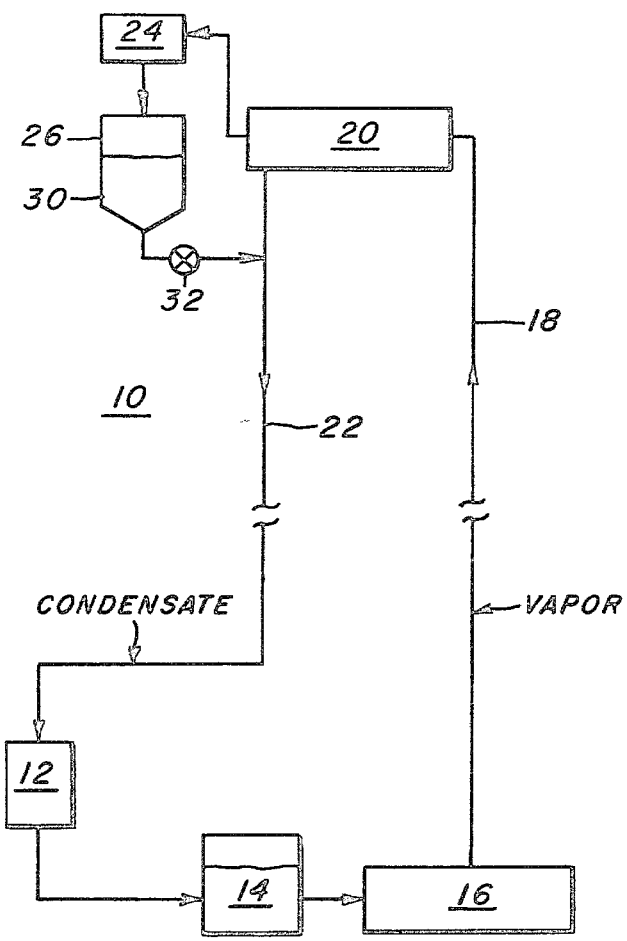

ATMOSPHERIC THERMAL ENERGY CONVERSION SYSTEM

BACKGROUND OF THE INVENTION

The present invention relates to a method of increasing the efficiency of a system providing useful work, such as the generation of electrical power, using elevation and temperature differences on the surface of the earth.

In U.S. Pat. Nos. 3,945,218 and 3,953,971 to Parker, systems for performing useful work are disclosed which utilize the differences in elevation that are naturally provided by mountainous regions and nearby valleys or desert floors and the naturally available temperature differences that occur between them. The disclosed systems include condenser means located at the higher and cooler elevation of the mountain, and means (an evaporator or boiler) located at the lower and warmer elevation, in a valley or desert below the mountain, for supplying heat to the system. A working fluid capable of vaporizing at a relatively low temperature is employed as the mechanism for converting temperature and pressure differences into useful work. The fluid absorbs heat from the heat supply means, at the warmer elevation, vaporizes, and rises in a pipe or conduit connecting the heat supply means to the condenser. When the fluid (vapor) reaches the condenser, which is relatively cold, the vapor condenses and the resulting liquid returns under the force of gravity through another pipe to the turbine of a power generation means, for example, located at the lower elevation. After passing through the turbine, the condensate (liquid) is directed to the heat supply means for a repeat of the cycle.

A process related to the above process, which is a land-base method using temperature differences in the atmosphere, is a process that utilizes the difference in temperature and pressure occurring between the ocean surface, which is relatively warm, particularly in the tropics, and the ocean depths where the temperature of the ocean water is substantially lower. The land-base, atmospheric thermal process, however, is more advantageous than the ocean process, as a land-base operation requires less capital per unit of power produced, i.e. the land-base operation can be constructed in readily accessible locations using standard, well-known engineering practices and materials, and ordinary transmission lines. Ocean conversion systems, on the other hand, require off-shore installations and platforms which must withstand the massive forces encountered with wave and tidal actions. Transmission of electrical energy is by cables that are designed to be located on the ocean bottom, such cables being more costly than the conductor employed to transmit power on dry land.

In an atmospheric conversion system, the temperature differential, as indicated above, for effecting vaporization and condensation of the working medium, is related to the vertical distance between the two elevations, i.e. the height of the mountain above the floor of the valley adjacent the mountain. For example, the average difference in air temperature for a 1,000 meter change in elevation is about 10° C., which is due to the cooling effect provided by the expansion of air in ascending from a lower to a higher elevation. If an atmospheric conversion system is to match the temperature differential (approximately 21° C.) of a typical oceanic conversion system, a difference of 2,110 meters is required, which provides a temperature differential of about 11° C. between the boiler and condenser when the two are operating to respectively evaporate and condense the working medium allowing a 5° C. temperature differential in both the boiler and condenser for transfer of heat.

The weight of the material of a column of vapor (of the working medium) is supported by the pressure differential existing between the heat supply means at the lower elevation and the condenser at the upper elevation. An additional increment of vapor pressure and pressure differential is needed to overcome the friction of the vapor in the conduit connecting the evaporator to the condenser to move the vapor from the evaporator to the condenser at a rate sufficient to provide a flow of condensate for the production of useful work.

The efficiency of a conversion system of the atmospheric type is calculated as the percent of thermal (heat) input that can be recovered as work from the column of condensate (liquid) of a height corresponding to that of the vapor, this height (or distance) being fixed. Hence, for a given column height of the working medium, with its particular density and attendant pressure drop, a working medium is needed that will provide maximum efficiency in giving up its work potential to the production of useful work, such as the generation of electrical power.

However, in an atmospheric conversion system, temperature changes occur between nighttime and daytime, and with changing weather conditions. This can result in a change in the temperature differential existing between the condenser at the upper elevation and the vaporizer at the lower elevation, or a change in the temperature values at both locations with the differential staying about the same. If the temperature differential increases, vapor will be moved at a higher velocity and more energy will be lost in overcoming pipe friction, resulting in a decrease in the efficiency of the system. Similarly, the temperature differential may decrease so that vapor could not be moved through the column. The system then would not operate at all unless the composition of the working medium is adjusted to meet the new conditions.

In U.S. Pat. No. 2,499,736 to Kleen, the amount of a refrigerant (ammonia) in a cooling circuit is changed in response to ambient temperature. The purpose of such an arrangement is to control the temperature of refrigeration units on aircrafts adapted to transport food. When an aircraft is at high altitudes, the ambient temperature is low; when the aircraft is on the ground such temperature is relatively high. Obviously then, when the aircraft is flying at high altitudes, less cooling work needs to be done. There is, however, no disclosure in the Kleen patent of supporting a column of vapor extending between locations of high and low altitudes in a manner that will maintain maximum working efficiency of the column.

BRIEF SUMMARY OF THE INVENTION

The present invention is directed to providing such efficiency, and is accomplished by changing the components in a column of a working mixture or composition (medium) in response to changes in the ambient temperature, the components and mixture being chosen and controlled in accordance with their ability to transfer their potential for work to the production of work at a current equilibrium temperature condition for the height of the media column which is fixed.

One embodiment of the invention employs two condensers or condensing sections (at the location of the higher altitude) and a mixture of miscible compounds having different temperatures at which they vaporize or boil and condense. The first of the condensers or condensing sections is sized to condense the larger portion or fraction of the mixture, while the second condenser, which can be relatively small, functions to condense the remaining portion or fraction. The relative amounts of the higher and lower boiling (and condensing) point compounds in the two condensed portions vary, as the two condensers will condense some portion of each compound. However, the majority of the higher boiling compound and fraction condenses in the larger condenser, while the majority of the lower boiling compound and fraction condenses in the smaller condenser. When the temperature changes, the mole percent of the mixture automatically changes in appropriate direction by increasing or decreasing the amount of the one compound relative to the other in the system. This can be accomplished by a storage tank or container connected to receive the output of the smaller condenser, which may produce primarily the lower boiling point compound (condensate), for example, and to control the return of the same to the system in response to changes in temperature. In this manner, the mixture of the working medium always has a pressure differential that is sufficient to support the vapor column, with just enough additional pressure differential to overcome friction in the vapor conduit. With a decrease in temperature and a deficient pressure differential, the lower boiling fraction is fed to the system from the supply thereof (in the storage tank) to restore the pressure differential by increasing the lower boiling point fraction of the mixture.

A temperature sensing means can be used to order the movement of the lower boiling point fraction to and from the storage tank, but the system of the invention is self-adjusting if the condensate in the storage tank is simply fed to the system at a slow rate, as explained in detail hereinafter. To facilitate separation of the condensate into separate fractions for composition adjustment of the working medium, the working medium may be a mixture of immiscible compounds.

BRIEF DESCRIPTION OF THE DRAWING

The invention, along with its objectives and advantages, will best be understood from consideration of the following detailed description and the accompanying drawing in which:

FIG. 1 is a schematic representation of a first embodiment of the invention.

FIGS. 2 and 3 represent schematically an embodiment of the invention in which immiscible liquids are employed as working media, FIG. 2 showing an arrangement in which a low boiling point component of the media has a density higher than that of a high boiling point component of the media, while FIG. 3 shows a fluid circuit in which the density of a low boiling point component is relatively low in comparison to a high boiling point component.

PREFERRED EMBODIMENTS OF THE INVENTION

Referring now to FIG. 1 of the drawing, a land-based system 10 is diagrammatically depicted in which the temperature difference between a relatively high elevation and a relatively low elevation is employed to produce useful work. More particularly, system 10 comprises a turbine and an electrical generator 12, a tank 14 and a boiler or evaporator means 16 located at a relatively low altitude location, such as a valley floor adjacent the base of a relatively high mountain. The invention, however, is not limited to producing electrical power, referring to turbine-generator 12, as system 10 is capable of doing other forms of useful work.

A pipe 18 connects the output of the boiler to the input of a relatively large condenser 20 located on the mountain and above 12, 14 and 16. The output of condenser 20 is directly connected to the turbine of 12 by a conduit or pipe 22, and to a relatively small condenser 24 located at the high altitude with condenser 20. Condenser 24 outputs to a tank or container 26 for holding a low boiling point component 30 of a working medium comprised of relatively high and low boiling point compounds, not otherwise depicted in FIG. 1, that are miscible in each other and that vaporize at a relatively low temperature. A low boiling point allows a source of inexpensive heat at the location of boiler 16, such as water from a warm lake or hot desert air to be directed to and through the mechanism (not shown) of the boiler to vaporize liquid being directed from turbine 12 by way of tank 14. Similarly, cold air or water from a cold lake at the location of the condensers can be directed to the condensers to cool the vapor entering the condensers from the boiler. The output of tank 26 is returned to the system under control of a valve 32.

System 10 is advantageous over previous systems employed to produce work by the use of thermal differences in that the composition of the working medium in system 10 is changed in response to a change in ambient temperature to provide a pressure differential in pipes 18 and 22 that is always consistent with the fixed height of the system, i.e. of conduits or pipes 18 and 22. In this manner, the potential of the columns (pipes 18 and 22) available for work is always the maximum available from the temperature differential.

The changes in the composition of the working medium of the invention are effected by the use of the small condenser 24, or a small condensing compartment (not shown) in the large condenser 20, tank 26 and valve 32 preferably set to return condensate to pipe 22 at a slow, predetermined rate. As discussed earlier, the working medium of the invention is a composition of relatively low and high boiling and condensing point compounds or fractions. A major portion of the medium, and particularly the higher boiling point component or fraction thereof, rising from the evaporator 16 in the form of vapor, will be condensed in the larger unit 20. This leaves a remaining portion of the vapor uncondensed and the composition of this portion will be primarily the lower boiling point compound and fraction.

When an increase in ambient temperature occurs, with the system operating under equilibrium conditions, the height of the column of vapor 18 supportable by the system increases. Since the physical height of the system (column) is fixed by virtue of the fixed nature of the system itself, there is an increase in pressure differential between the evaporator and condensers that is now in excess of that necessary to overcome pipe friction such that there is an increase in the flow of vapor up and through pipe 18 to the condensers. The condensers now produce more condensate, and tank 26 begins to accumulate the low boiling point component and fraction 30, as the flow thereof from 26 is controlled at a relativey slow rate by value 32. This reduces the low boiling point fraction of the working medium and thereby increases the fraction of the high boiling point component. The working column now has a pressure differential and a potential for work, at the new temperature, that provides just enough vapor flow to work the turbine at 12 without an excess of pressure differential and available work potential that is not used and therefore lost. In this manner, tank 26 and valve 32 take out of the system, when an increase in temperature occurs, the lower boiling point fraction until equilibrium occurs, at which time the flow from 26 equals the flow to 26 (from 24).

If the temperature decreases from an equilibrium value and condition, the reverse of the above operation takes place, i.e. the flow of vapor from 16 decreases such that condensers 20 and 24 produce less condensate for the turbine at 12. The decrease in the output of the smaller condenser now reduces the accumulation of the lower boiling point fraction 30 in 26. However, the lower boiling point fraction continues to flow through valve 32 thereby increasing the percentage of the lower boiling point fraction of the working mixture. This increases the vapor pressure of the mixture and thereby restores the pressure differential to a value suitable for the fixed height of the system. In this manner, (again) tank 26 and valve 32 feed the lower boiling fraction into the system until equilibrium occurs. When equilibrium occurs, the flow into and from 26 is the same.

The height and site of the working column for thermal conversion systems are chosen to provide the necessary difference in temperature. When a height is chosen that provides the necessary temperatures, a working medium is chosen that will generally function to provide useful work in the manner described. However, the physical characteristics of working media are varied, and many will not have a vapor pressure sufficient to support a vapor column the distance (vertical height) required for vaporization and condensation temperatures. Below is a list of thermodynamic properties of six compounds that are useful in explaining the problem. The properties are given for vaporization and condensation temperatures of 21.1° C. and 10° C., respectively.

TABLE I

| Compound | P (vapor pressure in kg/cm$^2$) | | d (vapor density in kg/m$^3$) | |
|---|---|---|---|---|
| | 21.1° C. | 10° C.* | 21.1° C. | 10° C. |
| F-12 (CCl$_2$F$_2$)** | 5.963 | 4.316 | 32.48 | 23.79 |
| Ammonia** | 9.056 | 6.271 | 6.928 | 4.863 |
| Propane** | 8.718 | 6.45 | 18.1 | 13.6 |
| Sulfur Dioxide** | 3.489 | 2.352 | 10.08 | 6.822 |
| Methyl Chloride** | 5.15 | 3.62 | 12.0 | 8.30 |
| Water*** | 0.02555 | 0.01253 | 0.01847 | 0.009412 |

*The temperatures at the bottom and top of the mountain are assumed to be 26° C. and 5° C., respectively, with the boiler operating at 21.1° C. and the condenser at 10° C.
**Handbook of Chemistry and Physics, 29th ed.
***Thermodynamic Properties of Steam, Keenan and Keyes These data can be used to calculate the height (h) of a column of vapor of each of the listed compounds that can be supported by the pressure difference ($\Delta P$) between evaporator 16 at 21.1° C. and condensers 20 and 24 at 10° C. by use of the following formula:

$$h = \frac{\Delta P}{d \text{ av.}}$$

This formula indicates generally the relationship of vapor pressure and density of the working medium in supporting a column of vapor of a working medium. Average density (d av.) is used in the formula because of the differences in density between the bottom and top of the vapor column. By use of the data in the above table of compounds and the above formula, the height of a column of vapor supportable by the compounds can be calculated. The results are listed as follows:

TABLE II

| Compound | h (height in meters) |
|---|---|
| F-12 (CCl$_2$F$_2$) | 585 |
| Ammonia | 4,724 |
| Propane | 1,431 |
| Sulfur Dioxide | 1,345 |
| Methyl Chloride | 1,507 |
| Water | 9,339 |

As discussed earlier, a vertical distance of 2,110 meters in the atmosphere provides a temperature differential suitable for vaporizing and condensing a working medium in a manner that is comparable to that of oceanic conversion systems. The above calculations indicate that only ammonia and water (of the above list) can lift vapors to a height of 2,110 meters. However, water is not a good choice because of the low density (see Table I) of the vapor. Such a density would require a very large diameter for turbine 12 and the volume of vapor conducted through pipe 18 would be too small to be practical. Ammonia alone can be used, but only about one-half of its available height and thus potential for work would be utilized in a column height of 2,110 meters, as indicated in Table II. As discussed earlier, what is needed is a medium having a height and pressure differential at the appropriate temperature difference that will support the weight of the vapor column with just enough excess pressure differential to equal the pressure necessary to overcome the friction of the vapor in pipe 18. With the above working height and temperature values, a mixture of 55 mole percent ammonia and 45 mole percent propane provides an operation in which the work potential of the column is substantially fully utilized by a single turbine at 12 receiving the liquid medium from condensers 20 and 24.

The calculated properties of the ammonia-propane mixture are given below, assuming that the contribution of each component is proportional to its fraction of the mixture.

TABLE III

| P kg/cm$^2$ | | d vapor kg/m$^3$ | |
|---|---|---|---|
| 21.1° C. | 10° C. | 21.1° C. | 10° C. |
| 8.904 | 6.352 | 11.955 | 8.795 |

The vapor pressure difference between 21.1° C. and 10° C. would lift a column of vapor to a height of 2,460 meters, using the earlier formula, which is 350 meters higher than the design height of 2,110 meters, thus providing sufficient pressure to lift the vapor to a height of 2,110 meters and also move the vapor at a reasonable velocity.

The above example of a 2,110 meter height (for a working column) and the two operating temperatures (21.1° C. and 10° C.), using an ammonia-propane mixture as the working medium, are given by way of example only, as the vertical heights, temperature differences and ambient temperatures will vary from site to site. Also, mixtures of other compounds can be used.

FIG. 2 of the drawing shows a system for using an immiscible mixture as the working medium of the invention with the low boiling point component having a density that is higher than that of the high boiling point component. The small condenser 24 in FIG. 2 outputs to a device 34 for separating the immiscible components, with the low density component being directly returned to the system from 34, while the higher density component is directed to storage tank 26. The operation of this system is otherwise the same as that described above in connection with FIG. 1 except that the components of immiscible mixtures are more easily separated than those of miscible mixtures.

FIG. 3 shows a system in which the density of a low boiling point component of an immiscible mixture is lower than that of the high boiling point component. Here, the low density material rises to the upper portion of separator 34, and is then directed to storage tank 26. The higher density material gravitates to the lower portion of the separator and returns directly to the system of the invention.

While the invention has been described in terms of certain embodiments, the claims appended hereto are intended to encompass all embodiments which fall within the spirit of the invention.

What is claimed is:

1. A method of providing useful work utilizing the difference between higher and lower elevations and an attendant difference in temperature, comprising the steps of:
    providing a working medium comprised of more than one component, the components having different temperature values at which they vaporize and condense,
    condensing vapors of the working medium at the location of the higher elevation, and directing the same under the force of gravity to means capable of utilizing the medium in liquid form to produce useful work,
    the working medium in liquid form absorbing heat at the location of the lower elevation to produce the vapors,
    directing the vapors from the lower elevation to the higher elevation for the condensing step, and
    adjusting the composition of the working medium in response to changes in ambient temperatures to provide a working medium having maximum efficiency in directing the vapors the distance between the lower and higher elevations.

2. The method of claim 1 in which the step of condensing the vapors of the working medium includes the steps of:
    providing a first condensing unit for receiving the vapors from the location of heat absorption and for condensing a mixture of the vapors of the working medium having a relatively high boiling point, while vapors having a relatively low boiling point remain uncondensed in the first condensing unit,
    directing the vapors having the relatively low boiling point from the first condensing unit to a second condensing unit, and
    condensing therein vapors having the low boiling point.

3. The method of claim 2 including the step of adjusting the composition of the working medium by mixing condensate from the second condensing unit which condensate from the first condensing unit, in response to changes in ambient temperature.

4. The process of claim 1 in which the working medium is a combination of miscible components.

5. The process of claim 1 in which the working medium is a combination of immiscible components.

* * * * *